United States Patent Office 2,925,820
Patented Feb. 23, 1960

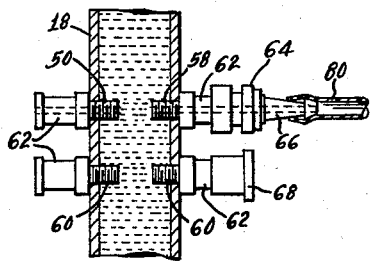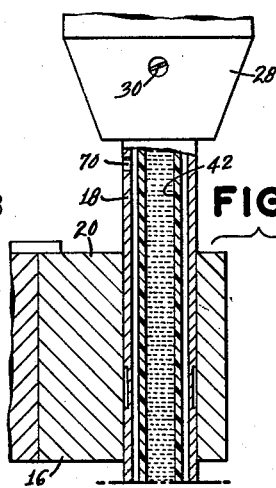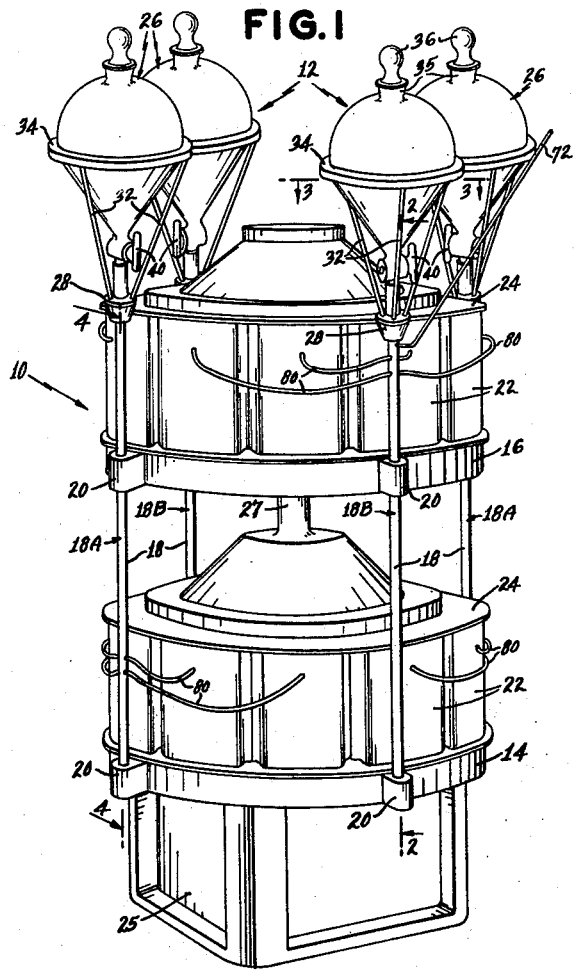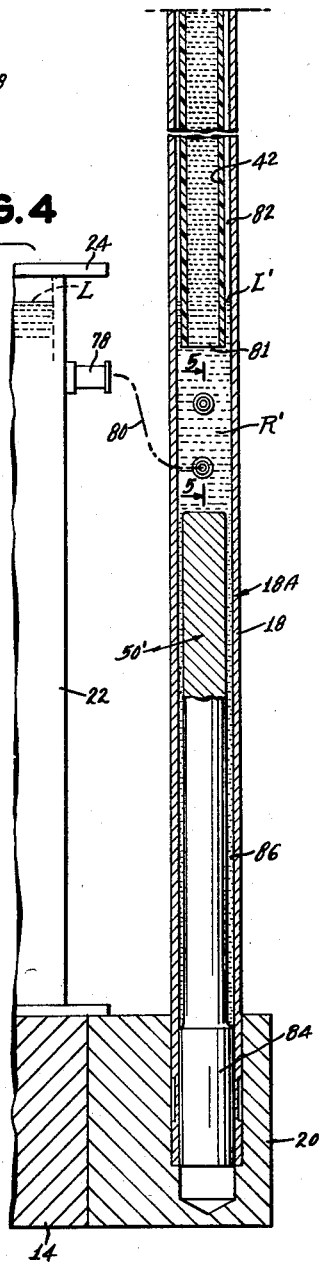
Feb. 23, 1960 — E. C. WEISKOPF ET AL — 2,925,820
AUTOMATIC LIQUID SUPPLY FOR IMMERSION APPARATUS
Filed Oct. 3, 1957
INVENTORS
Edwin C. Weiskopf
George Gorham
ATTORNEYS Feb. 23, 1960     E. C. WEISKOPF ET AL     2,925,820
AUTOMATIC LIQUID SUPPLY FOR IMMERSION APPARATUS
Filed Oct. 3, 1957     2 Sheets-Sheet 2
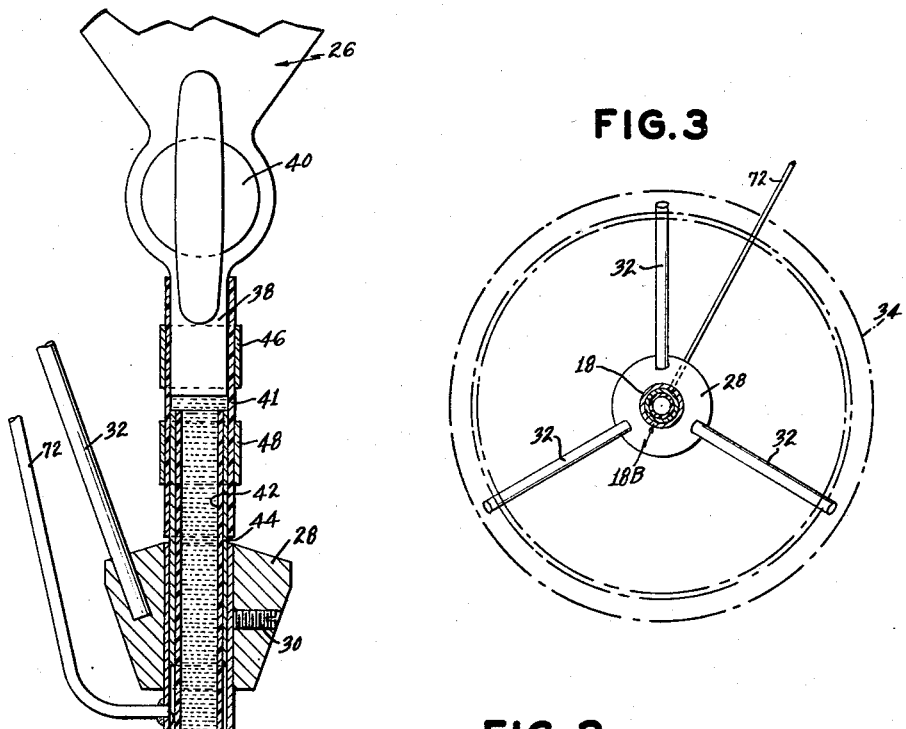
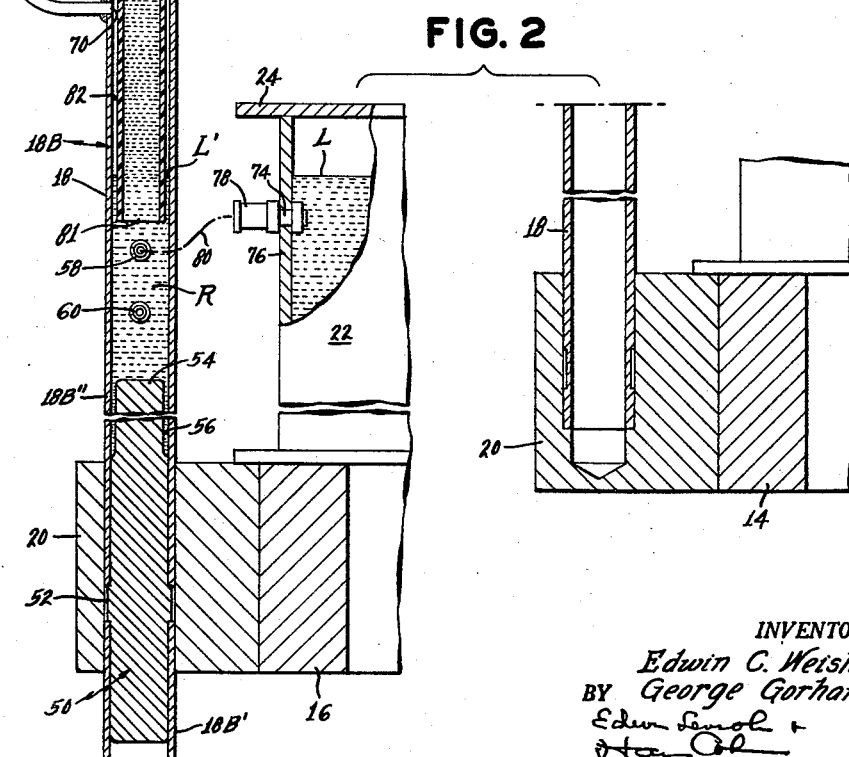
INVENTORS
Edwin C. Weiskopf
BY George Gorham
ATTORNEYS

2,925,820

AUTOMATIC LIQUID SUPPLY FOR IMMERSION APPARATUS

Edwin C. Weiskopf, Brewster, and George Gorham, New York, N.Y., assignors to Technicon International, Ltd., Chauncey, N.Y., a corporation of New York Application October 3, 1957, Serial No. 688,052

5 Claims. (Cl. 134—56)

The present invention relates in general to an automatic liquid supply system and in partciular to such a system for an immersion apparatus.

An object of the present invention is the provision of a liquid supply system wherein liquid is automatically supplied from a source thereto to a receptacle in which the liquid is utilized so as to maintain a predetermined level of liquid in the receptacle whereby to compensate for evaporation or other losses from the receptacle.

Another object is the provision of an automatic liquid supply system wherein one or more receptacles may be automatically supplied with liquid from a common supply so as to maintain a predetermined liquid level therein.

Another object is to provide a liquid supply system wherein a reservoir from which the liquid is being automatically supplied to a utility receptacle is automatically replenished when the liquid level thereof declines to a predetermined level so as to maintain a predetermined liquid level in the receptacle.

Another object is to provide a liquid supply system having a reservoir to supply a utility receptacle and a supply source positioned above both the reservoir and the receptacle.

A further object is to prevent the entrapment of air between the reservoir and the utility receptacle of an automatic liquid supply system.

The above and other objects, features and advantages of the present invention will be more fully understood from the following description considered in connection with the accompanying illustrative drawings.

In the drawings which illustrate the best mode presently contemplated of carrying out the invention:

Fig. 1 is a view in elevation of an automatic immersion apparatus provided with an automatic liquid supply system pursuant to the present invention;

Fig. 2 is a sectional view, on an enlarged scale, taken on the line 2—2 of Fig. 1;

Fig. 3 is a sectional view, on an enlarged scale, taken on the line 3—3 of Fig. 1;

Fig. 4 is a sectional view, on an enlarged scale, taken on the line 4—4 of Fig. 1; and Fig. 5 is a fragmentary sectional view, on an enlarged scale, taken on the line 5—5 of Fig. 4.

Referring now to the drawings in detail, there is illustrated an automatic immersion apparatus 10, for treating histologic tissue, which is provided with an automatic liquid supply system 12 pursuant to the present invention.

As here shown, the immersion apparatus 10 is of the type illustrated and described in Patent No. 2,741,221 assigned to the assignee of the present invention. As here shown, apparatus 10 comprises a pair of horizontal supports 14 and 16 which are retained in fixed vertical disposition by the four mounting rods 18 which are secured to lugs 20 provided on said horizontal supports. Each horizontal support mounts a plurality of containers or beakers 22 which are arranged in a circle thereon and covered by a common circular cover 24. The beakers contain various liquids for the treatment of the tissue and the arrangement is such that each ring cover 24 also mounts a suitable tissue basket or holder (not illustrated) which is automatically immersed in succession in the liquids of the associated beakers. In this connection, it will be understood that each of the covers 24 is mounted by the common shaft 27. Said shaft is mounted both for vertical reciprocation and for stepwise rotary movements, by suitable mechanism in the base 25, so as to move each tissue holder upwardly from one receptacle, then laterally over the adjacent receptacle, and then downwardly into said adjacent receptacle for immersing the holder in the fluid of the latter, as fully illustrated and described in said patent.

Although the various beakers or containers 22 are covered by the associated ring cover 24 when the cover is in the position thereof shown in Fig. 1, a highly volatile liquid contained in a beaker, such as, for example and not by way of limitation, chloroform, can and does evaporate from the beaker, especially when the cover is raised for transferring the tissue holder from one beaker to another beaker. While the automatic immersion apparatus 10 is provided with a plurality of receptacles or beakers 22 on each of the horizontal supports 14 and 16 thereof, in which various different liquid reagents are provided, the present invention is intended more specifically for use in connection with the more volatile liquids, so as to automatically maintain a predetermined liquid level within the receptacles of said volatile liquid for processing the histologic tissue immersed therein.

Pursuant to the present invention, the various vertically extending posts 18 are constituted by tubular members through which the liquids are supplied to the beakers. As here shown, the tubular members 18A are utilized to supply the beakers on the lower support 14 and the tubular members 18B are utilized to supply the beakers on the upper support 16.

Each post mounts a bottle or flask 26 for containing a supply of the liquid which is to be supplied through the associated post or tubular member. As best illustrated in Fig. 2 support plug 28 is provided on each tube adjacent the upper end thereof, the tube extending through the support plug which is secured in position thereon, as by a set screw 30. Three equally spaced mounting rods 32 are secured at their lower ends in each support plug 28 and flare outwardly therefrom to mount a ring 34 at the upper ends thereof. Each flask 26 is mounted in inverted disposition in an associated ring 34, as best illustrated in Fig. 1. As here shown, each flask is provided with an inlet 35 at its upper end, which is hermetically closed by a removable stopper 36, and tapers toward its lower end 38 in which there is mounted a valve 40. Valve 40 has a fluid-tight seal with its seat at the lower end of flask 26 to prevent the passage of air into the flask. Said valve is normally open for the flow of liquid from the flask downwardly through tube 42. Said valve is closed when stopper 36 is removed for introducing liquid into the flask through inlet 35. A flexible tube 41 interconnects the valved end of flask 26 and the adjacent end of a supply tube 42 which is disposed within each associated tube 18 and which extends upwardly therefrom. More specifically, a filler tube 44 is interposed between each support tube 18 and associated supply tube 42, at the upper end of the tube 18, and extends from the support plug 28 upwardly of the latter. The previously mentioned tube 41 extends from the lower end of the flask to overlie the upper end of the filler tube 44 which, in turn, overlies the upper end of the associated liquid supply tube 42, as best illustrated in Fig. 3. Clamps 46 and 48 clamp the connecting tube 41 to the outlet end of the flask 26 and to the filler tube 44, respectively, with the conically shaped flask supported at its maximum diameter by the support ring 34. Each tube 18 is seated in a lateral projection 20 of the lower support 14, as best illustrated in Figs. 2 and 4, and extends through the aligned projection 20 on the upper support 16.

Referring now to Figure 2 in detail, which illustrates a post 18B through which the liquid is supplied to beakers 22 on the upper horizontal support 16, it will be noted that said post is provided with a filler member 50 having an enlarged diametrical portion 52 which extends between a lower post section 18B′ and an upper post section 18B″. The filler 50 extends upwardly of the upper support 16 and the major longitudinal extent thereof is in surface-to-surface contact with the inner surface of the post sections 18B′ and 18B″, to constitute a liquid seal therebetween. Filler member 50 reduces the volume in tube 18B for the reservoir R. However, since said filler member has a pressed fit within tube 18, a slight clearance, indicated at 56, is provided so as to facilitate the assembly of said filler member within tube 18.

Each tube 18B is provided also, above the filler 50, with the two pairs of diametrically related outlets 58 and 60. Each outlet may be utilized to supply one beaker 22 through a conduit 80. As best shown in Fig. 5, each outlet has an adaptor 62 which is secured in an associated opening in the tube where the outlet is to be used to supply a beaker, and an additional adaptor 64, provided with a nipple 66 is provided on the adaptor 62. Where an outlet is not being used for supplying a beaker, a plug 68 is secured in the adaptor 62 thereof. Each tube 18 is provided also with an air inlet opening or vent 70 below the apertured support member 28. In the case of the tube 18B for supplying beakers on the upper horizontal support 16, the vent 70 is provided with an air inlet tube 72 which is suitably secured therein.

The beakers 22 are of any suitable construction and, as here shown, each beaker 22 is provided with a fluid inlet opening 74 in the wall 76 thereof, said opening having an adaptor 78 mounted therein for connection to one end of a flexible tube 80 (Fig. 5), the other end of which is connected to an associated nipple 66 provided on an associated tube outlet, as described. In the case of the tube 18B for supplying the beakers 22 on the upper support 16, the various outlets are provided therein slightly below the bottom of the supply tube 42 so that the interconnecting conduits 80 will be below the liquid level L in the associated beaker and the liquid level L′ in the associated tube 18B, to prevent air from entering the tube 80.

In supplying liquid to the beakers 22 of the upper support 16, the valves 40 of the associated flasks 26 are opened, and liquid will flow from the outlet end 38 of each flask through the inner tube 42 to the reservoir R defined in tube 18B by the filler member 50, the liquid flowing from an outlet of said tube through a flexible tube 80 and into the inlet 74 of the beaker to fill the latter until the liquid level L′ in the tube 18B, is above the outlet end 81 of the liquid supply tube 42 from the flask, the liquid level L in the beaker 22 being equalized with the liquid level L′ in the reservoir R. It will be noted that the height of the column of liquid in the reservoir R determines the height of the liquid in the beaker 22, and that the liquid column in the tube 18B normally extends above the bottom end 81 of the liquid supply tube 42 in the reservoir R. Thereafter, as the liquid level L in the beaker 22 drops with consumption of the liquid, liquid will flow through the tube 80 from the reservoir in the tube 18B to the associated beaker 22 to equalize said liquid levels. When the liquid level L′ in the reservoir R in tube 18B drops sufficiently to uncover the bottom or outlet end 81 of the liquid supply tube 42, air of the ambient atmosphere entering the reservoir R through the vent 72 and the clearance 82 between the outer tube 18B and the inner tube 42, will flow into the exposed outlet 81 and up the tube 42 into the flask to provide for liquid flow out of the flask and into the reservoir R substantially to the indicated level L′ so as to cover the outlet 81 of the tube 42 and discontinue liquid flow from the flask. The liquid level L in the beaker will rise to the liquid level L′ in the reservoir. Liquid will not flow from the flask 26 until the liquid level L′ in the reservoir is again below the outlet 81 of the inner tube 42. It will be noted that the tubes 80 which extend from the various outlets in the reservoir R of the tube 18B to associated beakers 22 on the upper support 16 are all below the liquid levels L′ and L so as to prevent the entrance of air into said tubes whereby to obviate the entrapment of air therein which could interfere with the free flow of the liquid through the tubes 80 to the associated beakers 22. It will also be noted that since the liquid which flows from the flask 26 is first received in the reservoir R within the tube 18B, it is possible to utilize the same flask 26 to supply a plurality of beakers 22 through the various outlets defined in the reservoir portion of the tube 18B.

Referring now to Figure 4 in detail, there is illustrated a tube 18A for supplying the beakers 22 of the lower horizontal support 14. Since the tube 18A supplies the lower beakers 22, the column of liquid is formed in the reservoir R′ thereof adjacent the lower support 14. In this connection, a filler member 50′ is inserted into the bottom of the tube 18A to define the reservoir R′. The bottom portion 84 of said filler is in surface-to-surface contact with the inner surface of the tube 18A at the bottom of the latter to provide a liquid seal therebetween. The filler 50′ has a smaller diameter upwardly of the portion 84 to define a clearance 86 between the filler member and the inner surface of the tube 18A for the same purpose as in filler member 50. The remainder of the construction is exactly the same as in the case of the tube 18B, similar parts having the same reference numerals. As described in connection with reservoir R of tube 18B liquid in the reservoir R′ of tube 18A will flow into the associated beakers on support 14 as the liquid in the beakers is consumed, and the liquid in the reservoir will be replenished when the liquid level L′ in reservoir R′ declines to a level where the outlet 81 of the associated liquid supply tube 42 is exposed.

While we have shown and described the preferred embodiments of our invention, it will be understood that various changes may be made in the present invention without departing from the underlying idea or principles of the invention within the scope of the appended claims.

Having thus described our invention, what we claim and desire to secure by Letters Patent, is:

1. In an automatic immersion apparatus, means for holding a plurality of containers, means having provision to immerse a tissue holder in succession in said containers for treatment by liquids therein, a tubular member extending upwardly of said containers and having provision to support a liquid supply container at the upper end thereof, means defining a vented reservoir in said member, a conduit extending between said reservoir and said one of said first mentioned containers to maintain the liquid in the latter at the same level as the liquid in said reservoir, and means extending within said tubular member from said supply container to provide an outlet from the latter at a predetermined level within said reservoir, whereby to provide for the replenishing of the liquid supply in said reservoir when the liquid therein is below said predetermined level.

2. In an automatic immersion apparatus, means for holding a plurality of containers, means having provision to immerse a tissue holder in succession in said containers for treatment by liquids therein, a tubular member extending upwardly of said containers and having provision to support a liquid supply container at the upper end thereof, means defining a vented reservoir in said member, a conduit extending between said reservoir and said one of said first mentioned containers to maintain the liquid in the latter at the same level as the liquid in said reservoir, and means extending within said tubular member from said supply container to provide an outlet from the latter at a predetermined level within said reservoir, whereby to provide for the replenishing of the liquid supply in said reservoir when the liquid therein is below said predetermined level, the inlet to said conduit from said reservoir being below said outlet.

3. In an automatic immersion apparatus, means for holding a pluarlity of containers, means having provision to immerse a tissue holder in succession in said containers for treatment by liquids therein, a tubular member extending upwardly of said containers and having provision to support a liquid supply container at the upper end thereof, means defining a vented reservoir in said member, a conduit extending between said reservoir and said one of said first mentioned containers to maintain the liquid in the latter at the same level as the liquid in said reservoir, and means extending within said tubular member from said supply container to provide an outlet from the latter at a predetermined level within said reservoir, whereby to provide for the replenishing of the liquid supply in said reservoir when the liquid therein is below said predetermined level, the inlet to said conduit from said reservoir being below said outlet, and an additional conduit having its inlet from said reservoir below said outlet and connected to another of said first mentioned containers.

4. In an automatic immersion apparatus, first and second horizontal supports disposed in vertically spaced relation, each of said supports having provision to hold a plurality of containers, means having provision to immerse tissue holders in succession in the containers on each of said supports for treatment by liquids therein, tubular members interconnecting said supports for mounting them in said vertically spaced relation, one of said tubular members having means defining a vented reservoir therein substantially at the upper of said horizontal supports, another of said tubular members having means defining a vented reservoir therein substantially at the lower of said horizontal supports, each of said reservoirs being in liquid flow communication with containers provided on the associated horizontal support to maintain the liquid in said containers at the level of the liquid in the associated reservoir, each of said tubular members mounting a liquid supply container for the associated reservoir above the containers of the associated horizontal support, and means in each tubular member defining an outlet for the associated supply container at a predetermined level within the associated reservoir, whereby to provide for the replenishing of the liquid supply in the associated reservoir when the liquid therein is below said predetermined level thereof.

5. In an automatic immersion apparatus, first and second horizontal supports disposed in vertically spaced relation, each of said supports having provision to hold a plurality of containers, means having provision to immerse tissue holders in succession in the containers on each of said supports for treatment by liquids therein, tubular members interconnecting said supports for mounting them in said vertically spaced relation, one of said tubular members having means defining a vented reservoir therein substantially at the upper of said horizontal supports, another of said tubular members having means defining a vented reservoir therein substantially at the lower of said horizontal supports, each of said reservoirs being in liquid flow communication with containers provided on the associated horizontal support to maintain the liquid in said containers at the level of the liquid in the associated reservoir, each of said tubular members mounting a liquid supply container for the associated reservoir above the containers of the associated horizontal support, and means in each tubular member defining an outlet for the associated supply container at a predetermined level within the associated reservoir, whereby to provide for the replenishing of the liquid supply in the associated reservoir when the liquid therein is below said predetermined level thereof, each reservoir having conduits extending to the associated containers of the associated horizontal support, and the inlets to said conduits being below said predetermined level of the associated reservoir.

References Cited in the file of this patent

UNITED STATES PATENTS

| 85,386 | Hunter | Dec. 29, 1868 |
| 425,614 | Klauder | Apr. 15, 1890 |
| 1,045,079 | Prunier | Nov. 19, 1912 |
| 1,374,335 | Sundh | Apr. 12, 1921 |
| 2,078,203 | Manning | Apr. 20, 1937 |
| 2,341,197 | Weiskopf | Feb. 8, 1944 |
| 2,341,198 | Weiskopf | Feb. 8, 1944 |
| 2,490,319 | Palsgrove | Dec. 6, 1949 |
| 2,725,276 | Griset | Nov. 29, 1955 |

FOREIGN PATENTS

| 150,632 | Sweden | July 5, 1955 |